（12） United States Patent
Uematsu et al.

(10) Patent No.: US 11,951,926 B2
(45) Date of Patent: Apr. 9, 2024

(54) SEATING STATE DETECTION DEVICE

(71) Applicant: AISIN CORPORATION, Kariya (JP)

(72) Inventors: Toru Uematsu, Kariya (JP); Jun Amano, Kariya (JP); Takayuki Nakagome, Kariya (JP); Asami Yamazaki, Kariya (JP); Masafumi Yaegashi, Kariya (JP); Ryohei Fuwa, Kariya (JP)

(73) Assignee: AISIN CORPORATION, Kariya (JP)

( * ) Notice: Subject to any disclaimer, the term of this patent is extended or adjusted under 35 U.S.C. 154(b) by 69 days.

(21) Appl. No.: 17/658,548

(22) Filed: Apr. 8, 2022

(65) Prior Publication Data

US 2022/0396230 A1 Dec. 15, 2022

(30) Foreign Application Priority Data

Jun. 9, 2021 (JP) .................................. 2021-096753

(51) Int. Cl.
*B60R 21/015* (2006.01)

(52) U.S. Cl.
CPC .. *B60R 21/01534* (2014.10); *B60R 21/01532* (2014.10)

(58) Field of Classification Search
CPC .................... B60R 21/01534; B60R 21/01556
See application file for complete search history.

(56) References Cited

U.S. PATENT DOCUMENTS

| 5,482,314 A * | 1/1996 | Corrado ................ G06V 40/10 |
| | | 701/45 |
| 6,307,518 B1 * | 10/2001 | Hamperl ................ H01Q 1/32 |
| | | 343/866 |
| 2016/0311388 A1 * | 10/2016 | Diewald ................ G01S 13/56 |
| 2020/0290541 A1 * | 9/2020 | Mitani ............. B60R 21/01534 |
| 2022/0397643 A1 * | 12/2022 | Amano .................. G01S 13/34 |

FOREIGN PATENT DOCUMENTS

| JP | 2018-202921 A | 12/2018 |
| JP | 2019081400 A * | 5/2019 |

OTHER PUBLICATIONS

Takeki Yamaguchi, Orientation Determination Device for Child Seat, EPO, JP 2019-081400 A, Machine Translation of Description (Year: 2019).*

* cited by examiner

*Primary Examiner* — James A English
(74) *Attorney, Agent, or Firm* — Oblon, McClelland, Maier & Neustadt, L.L.P.

(57) ABSTRACT

A seating state detection device includes an acquisition unit configured to acquire a detection signal group in a predetermined period that is output as a result of transmission and reception of waves by a radio wave sensor mounted on a vehicle, a signal extraction unit configured to extract specific-intensity signals in a predetermined reflection intensity range from the detection signal group, and a determination unit configured to determine whether an occupant in the vehicle is in a first riding state in which the occupant is directly seated on a seat or in a second riding state in which the occupant is seated in an infant auxiliary device, based on a distribution mode of the specific-intensity signals.

3 Claims, 6 Drawing Sheets

SEATING STATE DETECTION DEVICE

CROSS REFERENCE TO RELATED APPLICATIONS

This application is based on and claims priority under 35 U.S.C. § 119 to Japanese Patent Application 2021-096753, filed on Jun. 9, 2021, the entire content of which is incorporated herein by reference.

TECHNICAL FIELD

This disclosure relates to a seating state detection device.

BACKGROUND DISCUSSION

In the related art, a technique has been proposed in which various sensors installed in a vehicle are used to perform detection of the presence or absence of an occupant in a vehicle cabin, detection of the number of occupants, identification of an adult and a child, and the like, and reflect the results in vehicle control. For example, a technique for realizing a so-called "seat-belt reminder" has been proposed in which the presence or absence of an occupant is detected by using a radio wave sensor, and despite the presence of the occupant, an alarm is output when his/her seat belt is not worn during traveling of a vehicle. When the occupant is seated directly on a seat, whether the seat belt is fastened can be easily detected, and a seat-belt reminder can be properly output.

Examples of the related art include JP 2018-202921A (Reference 1).

However, there are cases where an infant auxiliary device, that is, a so-called child seat, a junior seat, or the like is mounted on a seat of a vehicle to allow an occupant (infant) to sit. As modes of fixing an infant auxiliary device to a seat, there are a belt fixing type in which the infant auxiliary device is restrained by using a seat belt provided in each seat and a direct fixing type (ISOFIX type) in which the infant auxiliary device is directly fixed to a part of the seat (for example, a metal fitting fixed to the seat) without using the seat belt. When an infant auxiliary device of the direct fixing type is mounted, the seat-belt reminder may be erroneously output. For example, in a case of the infant auxiliary device of the belt fixing type, since the seat belt, which is a condition of an output of the seat-belt reminder, is always in a fastened state, the seat-belt reminder is not output (it is assumed that an infant is fixed by a belt provided in the infant auxiliary device). On the other hand, in a case of the infant auxiliary device of the direct fixing type, the seat belt of the seat on which the infant auxiliary device is mounted is not used, and thus, when an occupant (infant) is detected in the infant auxiliary device during traveling of the vehicle, the seat-belt reminder is output, which may bother the occupant.

A need thus exists for a seating state detection device which is not susceptible to the drawback mentioned above.

SUMMARY

A seating state detection device according to an aspect of this disclosure includes: an acquisition unit configured to acquire a detection signal group in a predetermined period that is output as a result of transmission and reception of waves by a radio wave sensor mounted on a vehicle; a signal extraction unit configured to extract specific-intensity signals in a predetermined reflection intensity range from the detection signal group; and a determination unit configured to determine whether an occupant in the vehicle is in a first riding state in which the occupant is directly seated on a seat or in a second riding state in which the occupant is seated in an infant auxiliary device, based on a distribution mode of the specific-intensity signals.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an exemplary embodiment will be described. Configurations of the embodiment described below and operations, results, and effects obtained by these configurations are examples. The disclosure can be implemented by configurations other than those disclosed in the following embodiment, and at least one of various effects based on basic configurations and derived effects can be obtained.

For example, a seating state detection device according to the present embodiment transmits radio waves of a predetermined frequency, which are transmitted from a radio wave sensor, toward a seat present in a vehicle cabin, an infant auxiliary device (for example, a child seat, a junior seat, or the like) fixed to the seat, or an occupant (an adult, a child, an infant, or the like) who is seated on the seat present in the vehicle cabin or seated in the infant auxiliary device, and acquires detection signals which are reflected waves of the radio waves. The seating state detection device determines, based on the detection signal, whether the occupant in the vehicle is in a first riding state in which the occupant is directly seated on the seat or in a second riding state in which the occupant is seated in the infant auxiliary device. A determination result from the seating state detection device is used for various types of vehicle control. For example, when the occupant is not wearing a seat belt while the vehicle is traveling, a seat-belt reminder is output and is used to call attention to the occupant. Hereinafter, the seating state detection device will be described in detail.

Figure 1:
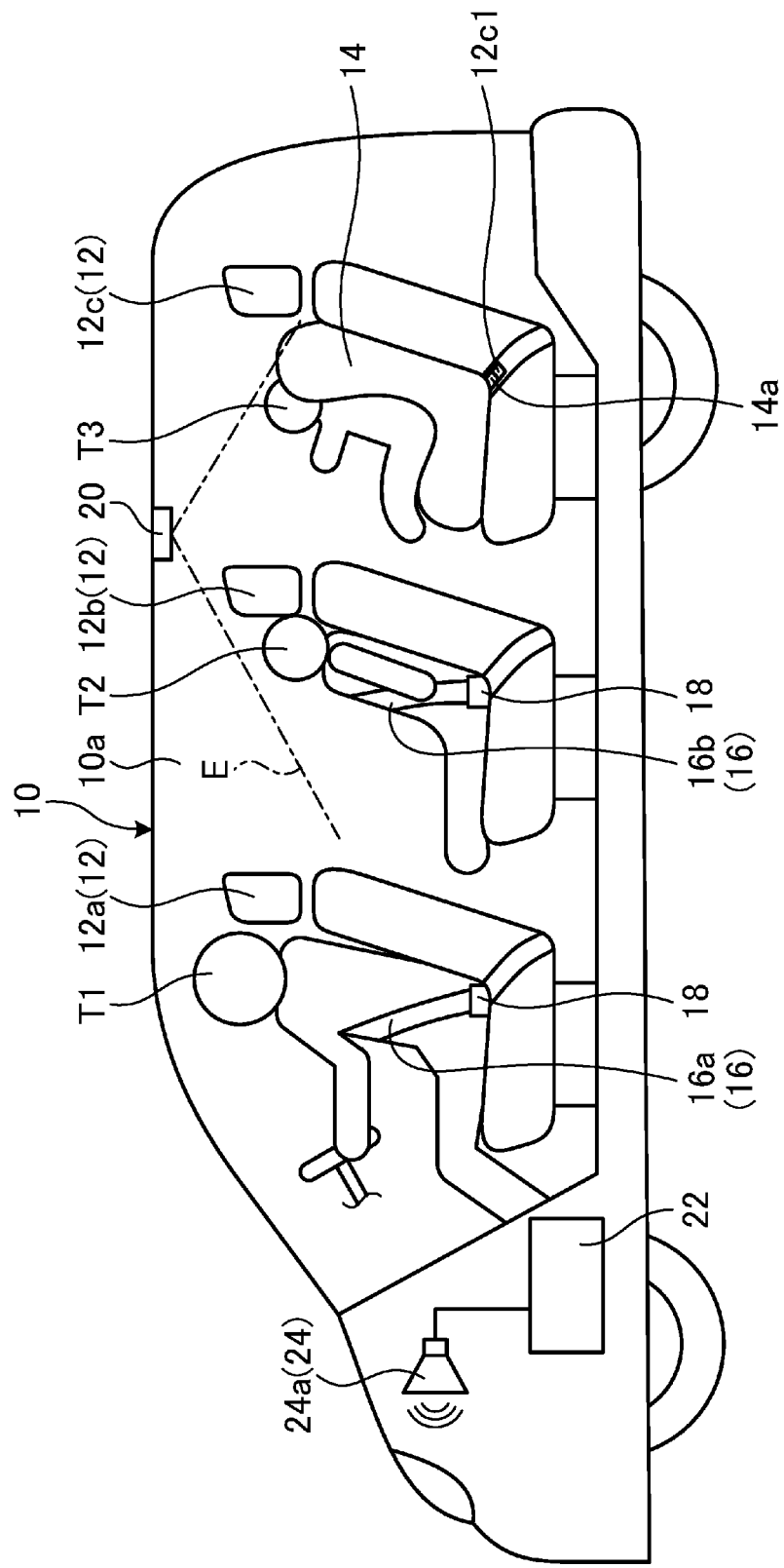
FIG. 1 is an illustrative diagram exemplarily and schematically showing a configuration of a vehicle on which a seating state detection device according to an embodiment is mounted.

FIG. 1 is an illustrative diagram exemplarily and schematically showing a configuration of a vehicle 10 on which the seating state detection device according to the present embodiment is mounted.

The vehicle 10 may be, for example, a vehicle (an internal combustion engine vehicle) that uses an internal combustion engine (an engine, not shown) as a drive source, a vehicle (an electric vehicle, a fuel cell vehicle, or the like) that uses an electric motor (a motor, not shown) as a drive source, or a vehicle (a hybrid vehicle) that uses the internal combustion engine and the electric motor as drive sources. Various transmission devices can be mounted on the vehicle 10, and various devices (systems, components, and the like) necessary for driving the internal combustion engine and the electric motor can be mounted on the vehicle 10.

As shown in FIG. 1, the vehicle 10 includes, in a vehicle cabin 10a, seats 12 on which occupants can be seated. In the case of the vehicle 10, the seats 12 have a seat configuration of three rows including a front-row seat 12a, a middle-row seat 12b, and a rear-row seat 12c. In the case of FIG. 1, an infant auxiliary device 14 (a child seat, a junior seat, or the like) used when an infant gets in the vehicle 10 is mounted on the rear-row seat 12c.

In FIG. 1, the infant auxiliary device 14 is a direct fixing type (ISOFIX type) in which the infant auxiliary device 14 is fixed to the rear-row seat 12c by inserting a socket 14a provided at a corresponding position of the infant auxiliary device 14 into a dedicated adapter 12c1 (a metal fitting or the like) provided in a seat frame or the like of the seats 12 (rear-row seat 12c). The adapter 12c1 is provided, for example, at a connection portion between a seat surface and a back surface of the seats 12. Compared with a belt fixing type in which the infant auxiliary device is restrained by using a seat belt provided in the seats 12, the infant auxiliary device 14 of the direct fixing type has advantages that the fixing work is easier, the fixing state does not vary, and the usability is better. An adapter similar to the adapter 12c1 can be provided for each seat 12 so that the infant auxiliary device 14 of the direct fixing type may be attached to and detached from any seat 12.

Each seat 12 is provided with a seat belt 16 for fixing a seated occupant. A metal fitting portion of the seat belt 16 is inserted into a seat belt adapter 18 provided at each seat 12, so that the seat belt 16 is fixed to the seat 12 and the seated occupant is fixed. An occupant T1 (a driver: an adult) seated on the front-row seat 12a is fixed by inserting a seat belt 16a into the seat belt adapter 18, and an occupant T2 (for example, a child) seated on the middle-row seat 12b is fixed by inserting a seat belt 16b into the seat belt adapter 18. The infant auxiliary device 14 fixed to the rear-row seat 12c is provided with a dedicated seat belt (for example, a four-point seat belt) (not shown), which is capable of fixing an occupant T3 (infant) to take a ride in the vehicle. Although not shown, the rear-row seat 12c is also provided with a seat belt similar to the seat belt 16b mounted on the middle-row seat 12b and a seat belt adapter. Therefore, when the infant auxiliary device 14 is not mounted on the rear-row seat 12c, an occupant (an adult or a child) can be safely fixed by using the seat belt.

As described above, in a case of the infant auxiliary device 14 of the direct fixing type, a seat belt provided by the seat belt 16 is not used. Even if the infant auxiliary device 14 is mounted on the rear-row seat 12c and the occupant T3 seated in the infant auxiliary device 14 wears the dedicated seat belt, the seat-belt reminder is output during traveling of the vehicle since the seat belt of the rear-row seat 12c is not used. That is, in order to execute vehicle control such as outputting an accurate seat-belt reminder in the vehicle 10 on which the infant auxiliary device 14 of the direct fixing type is mounted, the seating state detection device mounted on the vehicle 10 needs to determine whether an occupant in the vehicle 10 is in the first riding state in which the occupant is directly seated on the seat 12 or in the second riding state in which the occupant is seated in the infant auxiliary device 14.

Therefore, in the case of the vehicle 10 on which the infant auxiliary device 14 of the direct fixing type is mounted, the vehicle 10 includes a radio wave sensor 20. The radio wave sensor 20 outputs detection signals to be used in determining whether an occupant is in the first riding state or in the second riding state in which the occupant is seated in the infant auxiliary device 14. As the radio wave sensor 20, a well-known sensor can be used. An installation position of the radio wave sensor 20 may be any position in the vehicle cabin 10a, as long as the radio wave sensor 20 can transmit radio waves (microwaves, millimeter waves, or the like) to the seat 12, the infant auxiliary device 14, or an occupant seated on the seat 12 or seated in the infant auxiliary device 14 to be detected and can receive reflected waves (detection signals) of the transmitted transmission waves at the position. In the case of FIG. 1, the infant auxiliary device 14 can be mounted on at least one of the middle-row seat 12b and the rear-row seat 12c. Therefore, the radio wave sensor 20 is disposed at a position where radio waves can be transmitted and received regardless of whether the infant auxiliary device 14 is mounted on the rear-row seat 12c, the middle-row seat 12b, or neither. For example, the radio wave sensor 20 is disposed at a substantially central portion of a ceiling surface of the vehicle cabin 10a in a vehicle width direction, at a position (for example, a position slightly behind the headrest of the middle-row seat 12b) between the middle-row seat 12b and the rear-row seat 12c in a vehicle front-rear direction. In the case of the example of FIG. 1, a detection area E of the radio wave sensor 20 disposed on the ceiling surface covers the middle-row seat 12b and the rear-row seat 12c.

The detection signals (group) acquired from the radio wave sensor 20 are sequentially provided to the seating state detection device 22, and determination of the seating state is performed. A determination result or a control result based on the determination result is output from a notification device 24 (for example, a sound output device 24a (speaker), a display device, or the like) and notified to the occupant.

Figure 2:
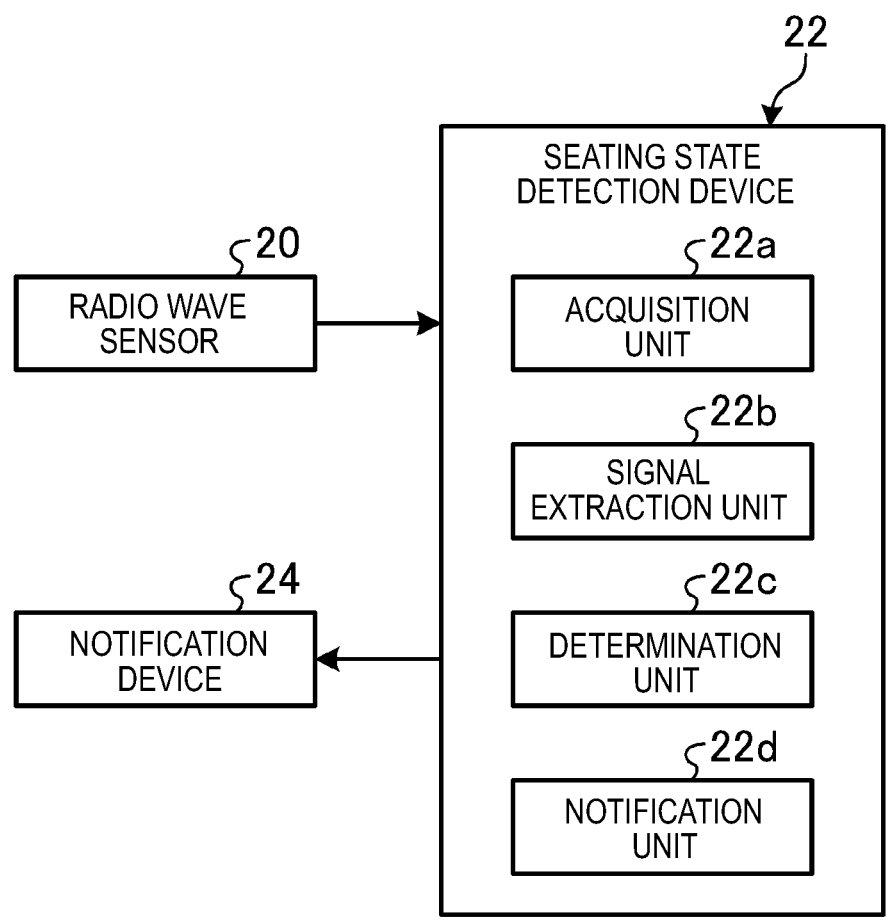
FIG. 2 is an exemplary and schematic block diagram showing a configuration of the seating state detection device according to the embodiment.

FIG. 2 is an exemplary and schematic block diagram showing a configuration of the seating state detection device 22.

The seating state detection device 22 includes an acquisition unit 22a, a signal extraction unit 22b, a determination unit 22c, a notification unit 22d, and the like.

The acquisition unit 22a sequentially acquires a detection signal group generated in a predetermined period that is output as a result of transmission and reception of waves by the radio wave sensor 20. When a seat-belt reminder function is to be implemented based on a detection result of the seating state detection device 22, the acquisition unit 22a makes an operation request to the radio wave sensor 20 to cause the radio wave sensor 20 to transmit radio waves of a predetermined frequency, for example, in a case where it can be confirmed that the vehicle 10 is traveling based on vehicle speed information or the like provided from the vehicle 10. The radio wave sensor 20 receives reflected waves reflected by the seat 12, the infant auxiliary device 14, the occupant, or the like, and sequentially provides the reflected waves to the acquisition unit 22a. The acquisition unit 22a sequentially provides the acquired detection signal group to the signal extraction unit 22b.

The signal extraction unit 22b extracts specific-intensity signals in a predetermined reflection intensity range from the detection signal group provided from the acquisition unit 22a. The radio wave sensor 20 can detect a change (movement amount) in a distance between an object and the sensor. As the movement amount of the object increases, an intensity of the detection signal (the reflected wave of the radio wave) increases. That is, the radio wave sensor 20 can measure a received signal for each position in a three-dimensional space. The radio wave sensor 20 determines that a "movement" is present when an absolute value of a time difference of the received signal is equal to or greater than a predetermined threshold, and determines that no "movement" is present when the absolute value is less than the predetermined threshold. Each position in the three-dimensional space is a discretized value, and in a predetermined space, the total number of points having "movement" (the absolute value of the time difference of the received signal is equal to or greater than the predetermined threshold) can be defined as a "movement amount". The radio wave sensor 20 can detect a distance to an object reflecting the radio wave based on time elapsed from transmission to reception of the radio wave. Therefore, based on the detection signal group provided from the acquisition unit 22a, a position where an object or a moving object is detected can be displayed, on three-dimensional coordinates, as a plot including information on the reflection intensity (a magnitude of the movement) and the position.

Therefore, for example, the signal extraction unit 22b can classify the detection signals by extracting specific-intensity signals in the predetermined reflection intensity range from the acquired detection signal group, and analyze characteristics of the detection signal group, that is, detect the presence or absence of an object (in the case of the present embodiment, the seat 12, the infant auxiliary device 14, and an occupant who can sit on the seat 12 or sit in the infant auxiliary device 14) that reflects radio waves.

A body movement (hand or foot movement or breathing movement) of the occupant T3 (infant) seated in the infant auxiliary device 14 and fixed by the dedicated seat belt propagates to the infant auxiliary device 14, and the infant auxiliary device 14 itself also moves slightly. In this case, the radio wave sensor 20 also detects a small movement of the infant auxiliary device 14. As described above, by extracting specific-intensity signals in the predetermined reflection intensity range from the detection signal group provided from the acquisition unit 22a, a plot of a specific intensity (intensity lower than a predetermined threshold) including the small movement of the infant auxiliary device 14 can be displayed on the three-dimensional coordinates.

On the other hand, for example, in a case where the occupant T2 (for example, a child) is directly seated on the middle-row seat 12b, a plot derived from the body movement propagated to the infant auxiliary device 14 is not present in the detection signal group. Therefore, by referring to the number of plots having detection signals (specific-intensity signals) from the infant auxiliary device 14, it is possible to determine whether the occupant T3 (infant) is seated in the infant auxiliary device 14 or the occupant T2 (for example, a child) or the like is directly seated on the seat 12.

Figure 3:
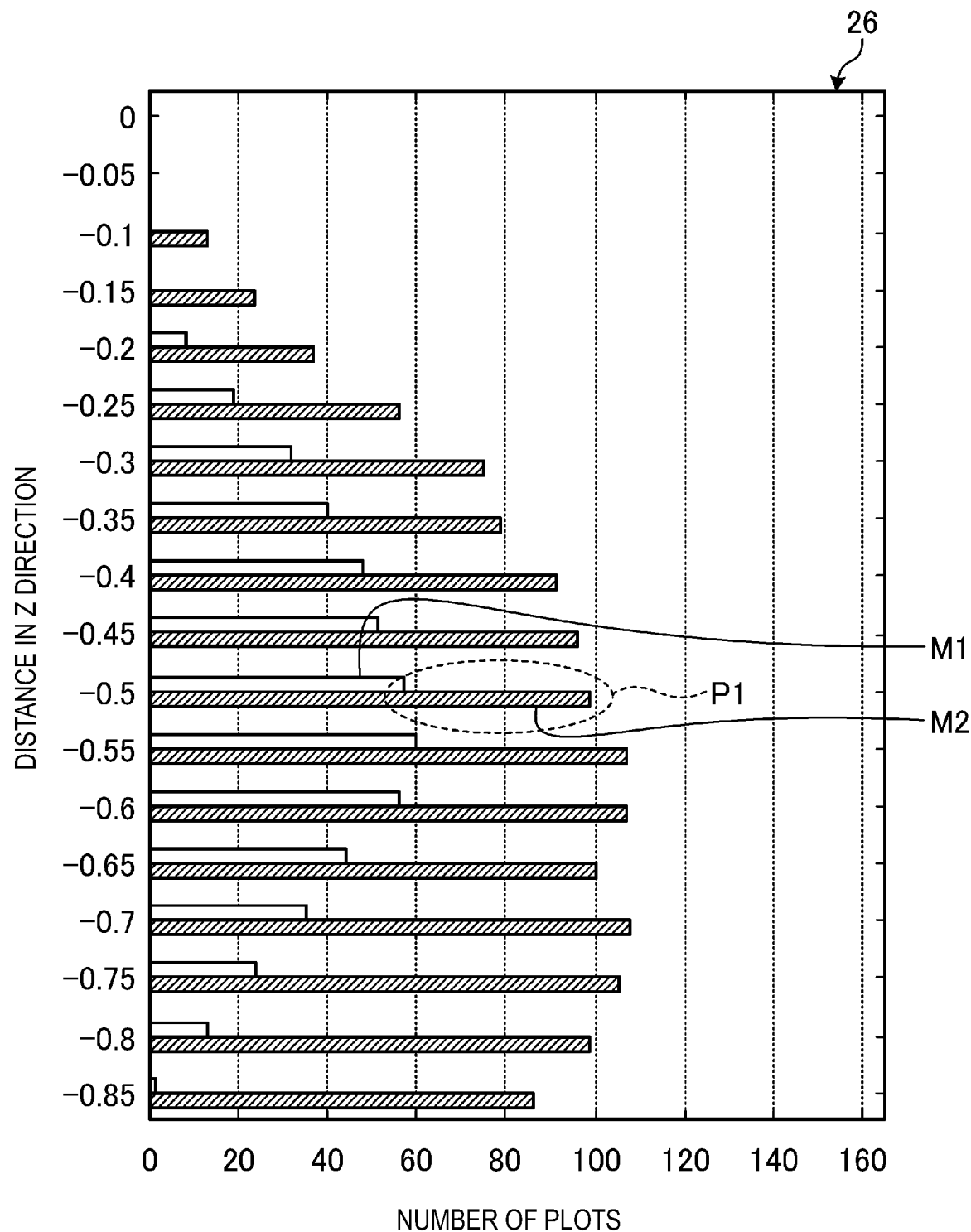
FIG. 3 is an exemplary graph showing a relationship between a plot distance and the number of plots of detection signals from a radio wave sensor in a predetermined detection intensity range, which are detected when an occupant is seated in an infant auxiliary device by the seating state detection device according to the embodiment.
Figure 4:
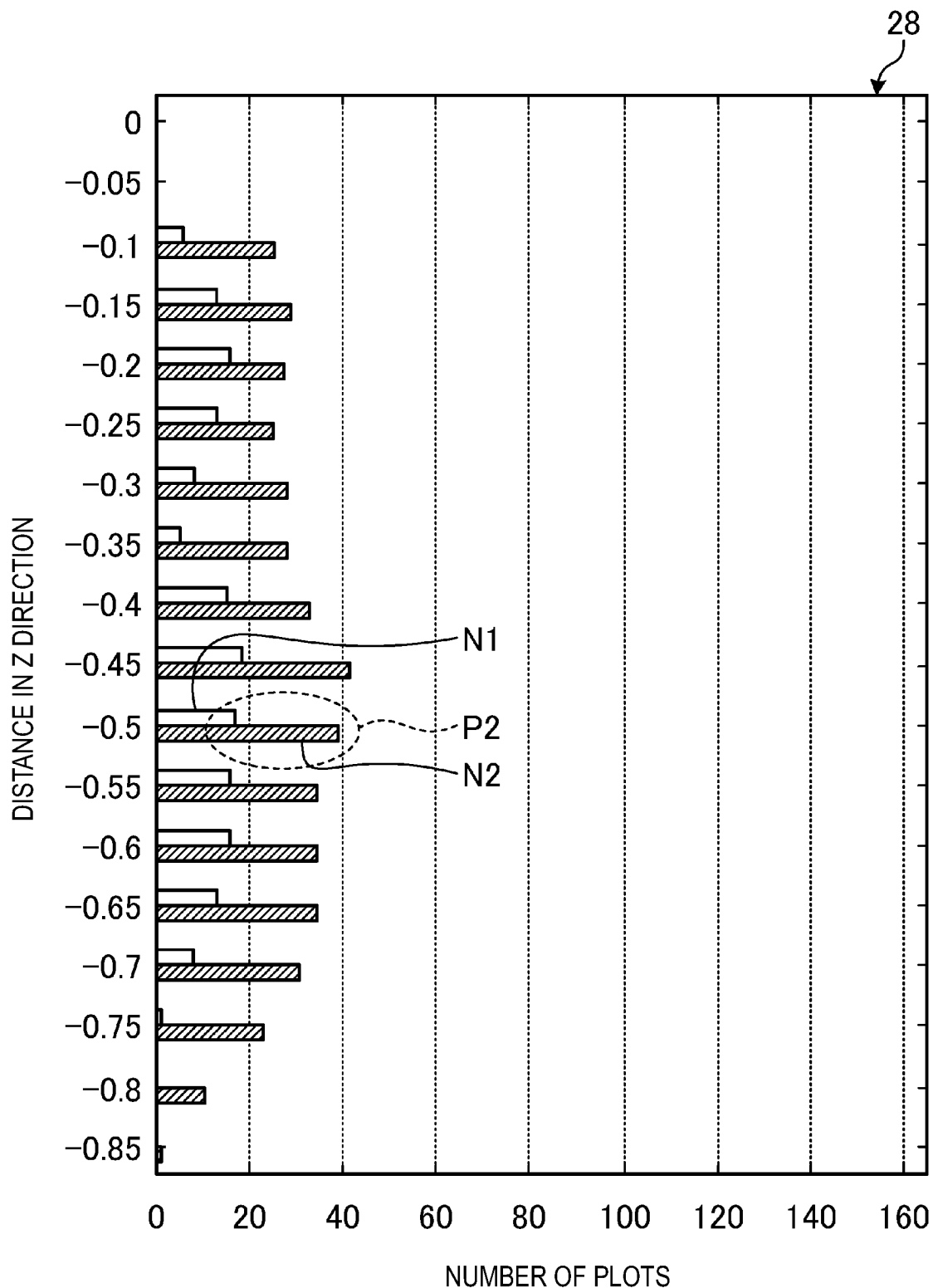
FIG. 4 is an exemplary graph showing a relationship between a plot distance and the number of plots of detection signals from the radio wave sensor in the predetermined detection intensity range, which are detected when an occupant is seated directly on a seat by the seating state detection device according to the embodiment.

Referring to FIGS. 3 and 4, it is shown that there is a difference in the detection signal group between a case where an infant is seated in the infant auxiliary device 14 and a case where an occupant is directly seated on the seat 12.

A graph 26 exemplarily shown in FIG. 3 shows a relationship between a plot distance and the number of plots of detection signals from the radio wave sensor in a predetermined detection intensity range, which are detected by the seating state detection device 22 when an occupant (infant) is seated in the infant auxiliary device 14.

In FIG. 3, a vertical axis represents a distance in a Z direction (vertical direction) from the radio wave sensor 20 disposed on the ceiling surface, and a horizontal axis represents the number of plots. A void bar M1 indicates the number of first detection signals included in a detection signal group and included in a first reflection intensity range of a predetermined first intensity or higher. A hatched bar M2 indicates the number of second detection signals included in a second reflection intensity range including the first intensity. Generally, in the case of an infant who is seated in the infant auxiliary device 14, his or her limbs are irregularly moved or his or her head is irregularly moved. As a result, the number of first detection signals indicating a strong movement increases. As described above, when the occupant T3 (infant) is seated in the infant auxiliary device 14, the movement of the occupant T3 propagates to the infant auxiliary device 14 and the infant auxiliary device 14 moves (vibrates), so that intensity signals (signals having a specific intensity) having an intensity lower than the predetermined threshold increase. In particular, since the infant auxiliary device 14 wraps around the infant, who is seated therein, in a close contact state, the vibration of the infant auxiliary device 14 propagates over a wide range. As a result, as the number of first detection signals indicating a strong movement increases, the number of detection signals having an intensity lower than the predetermined threshold also increases. That is, the number of second detection signals included in the second reflection intensity range including the first intensity increases, and a distribution mode thereof is characteristically shown.

A graph 28 exemplarily shown in FIG. 4 shows a relationship between a plot distance and the number of plots of detection signals from the radio wave sensor in the predetermined detection intensity range, which are detected by the seating state detection device 22 when an occupant (for example, a child) is seated directly on the seat 12.

In FIG. 4, a vertical axis represents a distance in the Z direction (vertical direction) from the radio wave sensor 20 disposed on the ceiling surface, and a horizontal axis represents the number of plots. A void bar N1 indicates the number of first detection signals included in a detection signal group and included in the first reflection intensity range of the predetermined first intensity or higher. A hatched bar N2 indicates the number of second detection signals included in the second reflection intensity range including the first intensity. In general, in the case of a grown-up child, fewer irregular movements of the limbs are seen than in an infant. As a result, the number of void bars N1, each of which indicates the number of first detection signals indicating a strong movement, is smaller than that of the bars M1 of FIG. 3 showing the case of an infant. The seat 12 on which the occupant 12 is seated directly is harder than the infant auxiliary device 14, and a movement (vibration) is less likely to propagate. As a result, as the number of first detection signals indicating a strong movement decreases and the propagation to the seat 12 decreases, the number of detection signals having an intensity lower than the predetermined threshold decreases. That is, the number of second detection signals included in the second reflection intensity range including the first intensity also decreases, and a distribution mode thereof is characteristically shown. In FIGS. 3 and 4, although the detection signals having an intensity lower than the predetermined threshold include a detection signal derived from the vibration of the vehicle 10, the number of detection signals having an intensity lower than the predetermined threshold in the case where the infant auxiliary device 14 is mounted with an infant seated therein is much larger than that in the case where the occupant is seated directly on the seat 12.

The determination unit 22c determines whether a riding state of the occupant is the first riding state or the second riding state, based on the specific-intensity signals extracted by the signal extraction unit 22b.

For example, when comparing the bar M1 and the bar M2 indicating specific-intensity signals shown in FIG. 3 that are acquired via the radio wave sensor 20 for the occupant T3 (infant) seated in the infant auxiliary device 14, there is a clear difference between the bar M1 (the number of first detection signals) and the bar M2 (the number of second detection signals). Here, a difference between the bar M1 (the number of first detection signals) and the bar M2 (the number of second detection signals) corresponds mainly to the number of detection signals having an intensity lower than the predetermined threshold and derived from the movement of the above infant auxiliary device 14. That is, when the number of detection signals (a difference) derived from the movement of the infant auxiliary device 14 is equal to or greater than a predetermined determination threshold, it can be considered that the radio wave sensor 20 acquires a group of received signals in a state in which the occupant T3 (infant) is seated in the infant auxiliary device 14. That is, the determination unit 22c can determine the second riding state, that is, the state in which the occupant T3 (infant) is seated in the infant auxiliary device 14, based on a magnitude of the difference between the number of first detection signals (bar M1) and the number of second detection signals (bar M2).

On the other hand, the specific-intensity signals shown in FIG. 4 acquired via the radio wave sensor 20 for the occupant T2 (for example, a child) who is seated directly on the seat 12, do not include detection signals having the intensity lower than the predetermined threshold and derived from the infant auxiliary device 14. That is, a difference between the bar N1 (the number of first detection signals) and the bar N2 (the number of second detection signals) shown in FIG. 4 is smaller than the difference between the bar M1 and the bar M2 shown in FIG. 3 in the case where the occupant T3 (infant) is seated in the infant auxiliary device 14. Therefore, when the difference between the number of first detection signals and the number of second detection signals is less than the above determination threshold, it can be considered that the radio wave sensor 20 acquires a group of received signals in a state in which the occupant T2 (for example, a child) is seated directly on the seat 12. That is, the determination unit 22c can determine the first riding state, that is, the state in which the occupant T2 (for example, a child) is seated directly on the seat 12, based on a magnitude of the difference between the number of first detection signals (bar M1) and the number of second detection signals (bar M2).

As shown in FIG. 3, when the occupant T3 (infant) is seated in the infant auxiliary device 14, a detection signal group generally indicating a movement is detected for a portion extending to a lower end portion from an upper end portion of the seat 12 including the infant auxiliary device 14, and the difference between the bar M1 and the bar M2 can be detected. Similarly, in FIG. 4, even when the occupant T2 (for example, a child) is seated directly on the seat 12, a detection signal group generally indicating a movement is detected for a portion extending to the lower end portion from the upper end portion of the seat 12, and the difference between the bar N1 and the bar N2 can be detected. When the occupant T2 (for example, a child) or the occupant T3 (infant) takes a ride in the vehicle 10, the occupant may be awake or may sleep, and variation tends to occur in the detection signal group. Therefore, here, the signal extraction unit 22b acquires (focuses on) a detection signal group when a detection wave of the radio wave sensor 20 is transmitted toward a position corresponding to a chest portion of the occupant T2 (for example, child) or the occupant T3 (infant) being seated. The position corresponding to the chest portion is a position at a distance in the Z direction with respect to the ceiling surface of the vehicle 10 on which the radio wave sensor 20 is installed, and is, for example, a position of −0.5 m. In this case, when the occupant T2 is fixed by the seat belt 16b of the middle-row seat 12b, or when the occupant T3 is fixed by a wire seat belt of the infant auxiliary device 14, a large movement of the occupant is restricted, and a movement accompanying breathing can be stably detected. For example, in a region P1 of FIG. 3 and a region P2 of FIG. 4, the determination unit 22c can stably perform the determination.

Figure 5:
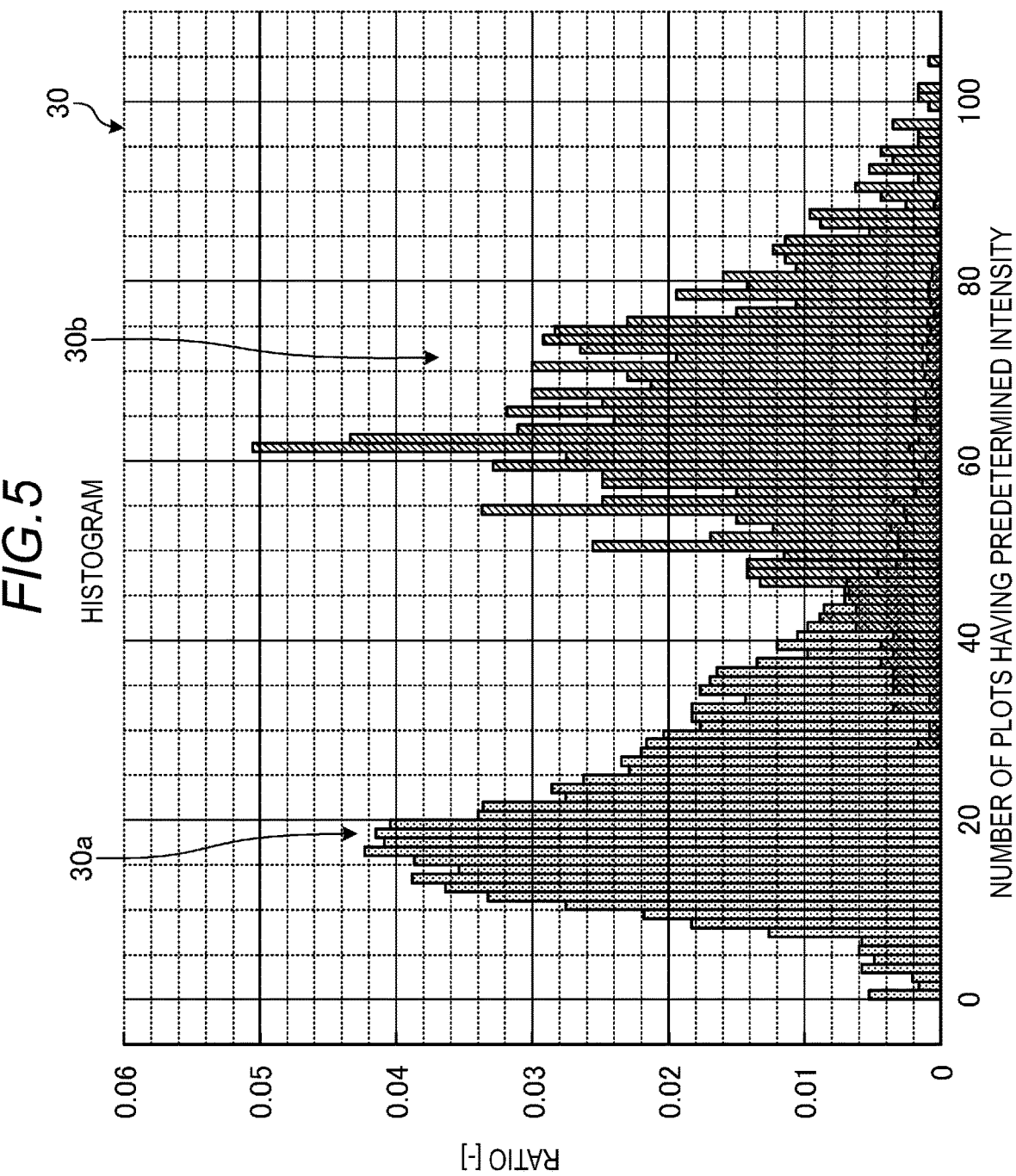
FIG. 5 is an exemplary histogram of the number of plots of detection signals in a case where the detection intensity range is narrowed down, which are detected when an occupant is directly seated on a seat and when an occupant is seated in the infant auxiliary device by the seating state detection device according to the embodiment.

A histogram 30 exemplarily shown in FIG. 5 shows the number of plots of the detection signals in a case where the detection intensity range is narrowed down to a predetermined range, the detection signals being detected by the seating state detection device 22 when the occupant T2 is directly seated on the seat 12 and when the occupant T3 is seated in the infant auxiliary device 14.

FIG. 5 is a histogram obtained by the signal extraction unit 22b extracting detection signals having an intensity lower than the predetermined threshold in a detection signal group detected in a longer period than in the cases of FIGS. 3 and 4 and generating a histogram based on the extracted detection signals. In this case, the histogram is clearly divided into a first distribution region 30a distributed in a region where the number of plots is relatively small and a second distribution region 30b distributed in a region where the number of plots is relatively large. As described above, when the occupant T2 is directly seated on the seat 12, since the detection signals having the intensity lower than the predetermined threshold and derived from the infant auxiliary device 14 are not included, the number of plots of the detection signals having the intensity lower than the predetermined threshold decreases. That is, when the distribution position of the number of plots indicates the first distribution region 30a, the determination unit 22c can determine the first riding state in which the occupant T2 is seated directly on the seat 12. On the other hand, when the occupant T3 is seated in the infant auxiliary device 14, a large amount of detection signals having the intensity lower than the predetermined threshold and derived from the infant auxiliary device 14 are included, and the number of plots of the detection signals having the intensity lower than the predetermined threshold increases. That is, when the distribution position of the number of plots indicates the second distribution region 30b, the determination unit 22c can determine the second riding state in which the occupant T3 is seated in the infant auxiliary device 14.

In this way, when the determination is performed based on the distribution position of the number of plots of the detection signals in the case where the detection intensity range is narrowed down, a feature indicating the first riding state and a feature indicating the second riding state become clear as compared with the cases of FIGS. 3 and 4. As a result, the determination unit 22c can determine the riding state with higher accuracy.

The notification unit 22d executes notification to the occupant based on a determination result of the determination unit 22c and information acquired from another control system of the vehicle 10. For example, the seat-belt reminder is executed as an example of the notification. For example, although it is confirmed that the occupant T2 is seated directly on the middle-row seat 12b (in the first riding state), the notification unit 22d determines that the seat belt 16b is not worn when information indicating that the seat belt 16b is not being inserted into the seat belt adapter 18 during the travelling of the vehicle 10 is acquired. In this case, the determination unit 22c outputs a voice message such as "Please wear the seat belt" via the sound output device 24a, as a message urging the occupant T2 to wear the seat belt 16b via the notification device 24, displays a message urging the occupant T2 to wear the seat belt on a display device for the driver's seat or on a display device that can be visually recognized by the occupant T2 in a posture of being seated on the middle-row seat 12b, or turns on an indicator lamp. It is needless to say that, in a case where the first riding state is not confirmed in the middle-row seat 12b (in a case where the occupant T2 is not confirmed), the seat-belt reminder is not executed even when the seat belt 16b is not inserted into the seat belt adapter 18 while the vehicle 10 is traveling. When the seat-belt reminder is executed, the traveling of the vehicle 10 may be restricted until the seat belt 16 is confirmed to be worn.

On the other hand, when the notification unit 22d confirms that the occupant T3 is seated in the infant auxiliary device 14 on the rear-row seat 12c (in the second riding state), the infant auxiliary device 14 of the direct fixing type is fixed to the rear-row seat 12c without using the seat belt of the rear-row seat 12c. At this time, it is assumed that the occupant T3 is fixed by the dedicated seat belt of the infant auxiliary device 14. Therefore, even when the information indicating that the seat belt of the rear-row seat 12c is not being inserted into the seat belt adapter during the traveling of the vehicle 10 is acquired, it is not determined that the seat belt is not worn. As a result, when the occupant T3 (infant) is fixed to the infant auxiliary device 14 by the dedicated seat belt, it is possible to avoid a malfunction of executing the seat-belt reminder.

Figure 6:
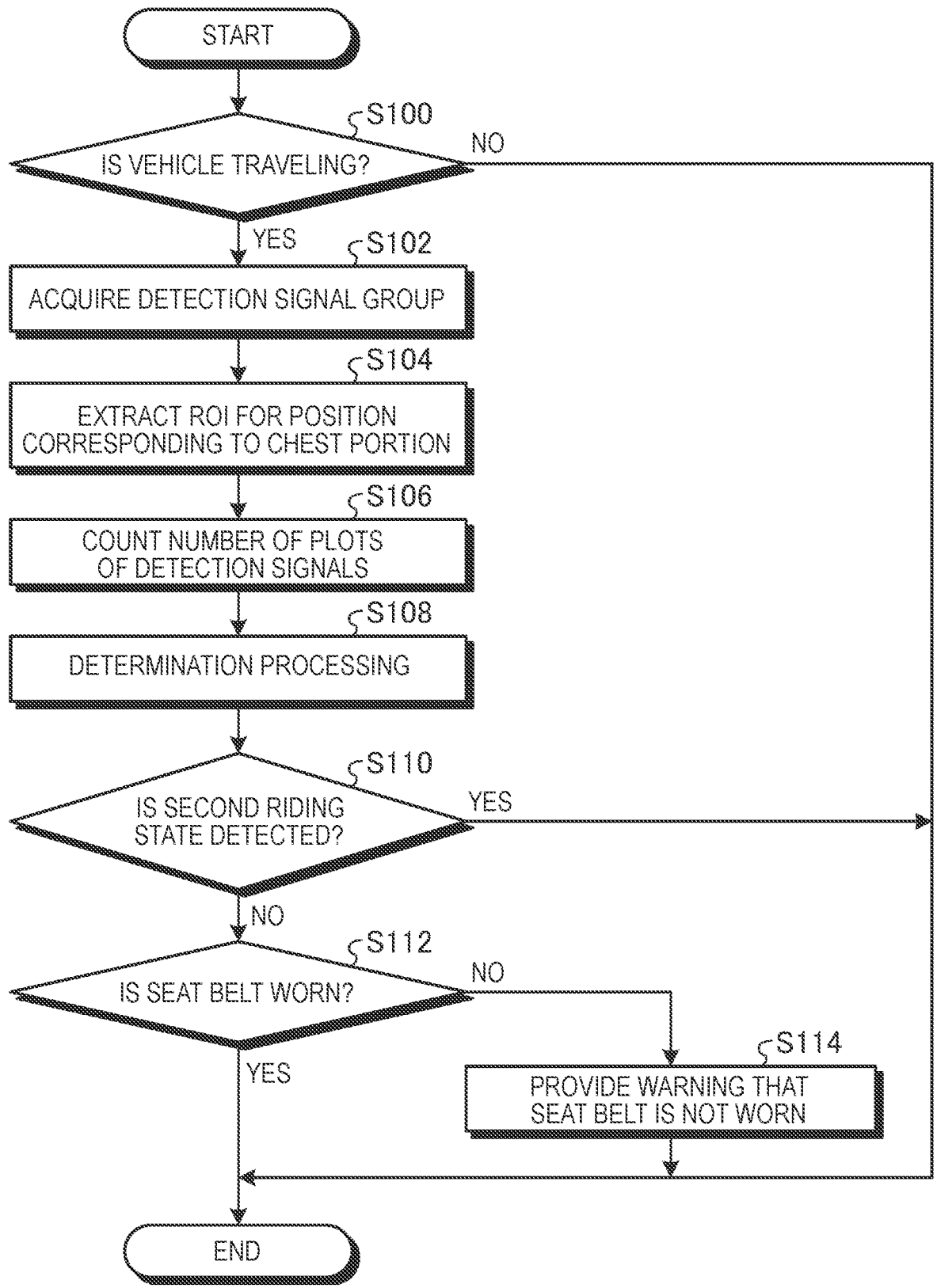
FIG. 6 is an exemplary flowchart illustrating determination processing of determining whether the infant auxiliary device is in an occupied state and seat-belt reminder processing using a result of the determination processing that are performed by the seating state detection device according to the embodiment.

FIG. 6 is an exemplary flowchart illustrating determination processing of determining whether the infant auxiliary device 14 is in an occupied state and seat-belt reminder processing using a result of the determination processing, which are performed by the seating state detection device 22 according to the embodiment. The flowchart of FIG. 6 is an example showing processing of determining the riding state, based on the distribution mode (distribution position) of the number of plots shown in FIG. 5.

When an ignition switch of the vehicle 10 is ON, the seating state detection device 22 constantly checks whether the vehicle 10 is traveling (S100). When the vehicle 10 is not traveling (No in S100), this flow is temporarily ended.

When it is confirmed in the processing of S100 that the vehicle 10 is traveling (Yes in S100), the acquisition unit 22a acquires a detection signal group from the radio wave sensor 20 (S102). Subsequently, the signal extraction unit 22b extracts an ROI (a region of interest) of a position corresponding to the chest portion from the detection signal group (S104), and counts the number of plots of detection signals in a case of narrowing down to a detection intensity range lower than the predetermined threshold (S106). The determination unit 22c executes determination processing of determining whether the distribution position of the number of plots indicates the first distribution region 30a or the second distribution region 30b as shown in FIG. 5 (S108).

As a determination result of the determination unit 22c, the second riding state (the state in which the occupant T3 (infant) is seated in the infant auxiliary device 14) is detected (No in S110), that is, the first riding state (the state in which the occupant T2 (for example, a child) is seated directly on the seat 12) is detected. In this case, the notification unit 22d confirms the wearing state of the seat belt 16 of the seat 12 to be detected (S112), and when the seat belt 16 is worn (Yes in S112), the flow is temporarily ended without executing the seat-belt reminder.

When it cannot be confirmed in the processing of S112 that the seat belt 16 is worn (No in S112), the seat-belt reminder is executed, a warning that the seat belt 16 is not worn is provided to the occupant, and the flow is temporarily ended.

When the second riding state is detected in the processing of S110 (Yes in S110), it is determined that the infant auxiliary device 14 of the direct fixing type is mounted on the rear-row seat 12c and the occupant T3 (infant) is fixed to the infant auxiliary device 14 by the dedicated seat belt. As a result, the flow is temporarily ended without confirming whether the seat belt 16 is worn.

Accordingly, according to the seating state detection device 22 according to the embodiment, when detecting the presence or absence of an occupant in the vehicle cabin, whether the occupant is in a directly-seated state of being directly seated on the seat or in a state of being seated in the infant auxiliary device can be detected easily and accurately. By using the result, the control of the vehicle 10 (for example, seat-belt reminder and the like) can be executed more accurately.

In the above-described embodiment, an example in which one radio wave sensor 20 is provided at a ceiling portion of the vehicle 10 has been described. In another embodiment, a plurality of radio wave sensors 20 may be provided. For example, one radio wave sensor 20 may be provided for each row of the seats 12, or one radio wave sensor 20 may be provided for each seat 12. For example, when each of the middle-row seat 12b and the rear-row seat 12c has three seats in the vehicle width direction, three radio wave sensors 20 may be provided in the vehicle width direction. By providing the plurality of radio wave sensors 20, it is possible to perform more accurate determination by the determination unit 22c. The installation position of the radio wave sensor 20 may be a position other than the ceiling portion, for example, a position of a headrest of the seat 12 in front of the seat 12 to be detected, or a position (corner) in the width direction other than the center in the vehicle width direction.

Although an example has been described in the above-described embodiment in which the infant auxiliary device 14 is mounted on the rear-row seat 12c, the infant auxiliary device 14 can be mounted on other seats such as the middle-row seat 12b, and the same effects as those of the present embodiment can be obtained.

In the present embodiment, an example has been described in which an occupant seated directly on the seat 12 is assumed to be a child and a sitting height thereof is substantially the same as that of an occupant (infant) seated in the infant auxiliary device 14. The present embodiment can also be applied to a case where an occupant (for example, an adult) with a high sitting height of the seat 12 is seated directly, and the same effects can be obtained.

Although an example of executing the seat-belt reminder based on the determination result of the determination unit 22c has been described in the above-described embodiment, the determination result may be used for other functions. For example, when an infant is taking a ride, gentler driving is desirable, so the determination result may be reflected in acceleration and deceleration control or the like of the vehicle 10. Although an example has been described in which the notification unit 22d executes the seat-belt reminder, a configuration of executing the seat-belt reminder may be provided separately from the seating state detection device 22 and may function based on the determination result of the seating state detection device 22.

Although the embodiment and modification of this disclosure are described, such embodiment and modification are presented as examples, and are not intended to limit the scope of this disclosure. Such new exemplary embodiments can be implemented in various other forms, and various omissions, replacements, and changes can be made without departing from the spirit of this disclosure. The accompanying claims and their equivalents are intended to cover such forms or modifications as would fall within the scope and spirit of this disclosure.

A seating state detection device according to an aspect of this disclosure includes: an acquisition unit configured to acquire a detection signal group in a predetermined period that is output as a result of transmission and reception of waves by a radio wave sensor mounted on a vehicle; a signal extraction unit configured to extract specific-intensity signals in a predetermined reflection intensity range from the detection signal group; and a determination unit configured to determine whether an occupant in the vehicle is in a first riding state in which the occupant is directly seated on a seat or in a second riding state in which the occupant is seated in an infant auxiliary device, based on a distribution mode of the specific-intensity signals. According to this configuration, for example, by focusing on the specific-intensity signal, it is easy to efficiently acquire detection signals of the time when the occupant (infant) is seated in the infant auxiliary device, and the first riding state and the second riding state can be easily identified.

In the seating state detection device according to an aspect of this disclosure, the signal extraction unit may extract the number of first detection signals included in a first reflection intensity range of a predetermined first intensity or higher and the number of second detection signals included in a second reflection intensity range including the first intensity, the first detection signal and the second detection signal being included in the detection signal group. The determination unit may determine whether the occupant is in the first riding state or the second riding state, based on a magnitude of a difference between the number of first detection signals and the number of second detection signals. According to this configuration, for example, detection signals having a predetermined intensity (for example, an intensity lower than a predetermined threshold), which are derived when the infant auxiliary device is moved due to a movement (for example, a breathing movement) of the occupant (infant) seated in the infant auxiliary device, can be efficiently extracted, and determination accuracy of the determination unit can be improved.

In the seating state detection device according to an aspect of this disclosure, the determination unit may determine whether the occupant is in the first riding state or the second riding state, based on a distribution position of the number of specific-intensity signals. According to this configuration, for example, the determination by the determination unit can be executed more precisely, and the determination accuracy can be improved.

In the seating state detection device according to an aspect of this disclosure, the signal extraction unit may, for example, acquire the detection signal group when a detection wave of the radio wave sensor is transmitted to a position corresponding to a chest portion of the occupant being seated. According to this configuration, for example, it is possible to easily and accurately determine whether an occupant is present based on the breathing movement that can be stably detected even in cases such as one where the occupant is sleeping.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seating state detection device comprising:
an acquisition unit configured to acquire a detection signal group in a predetermined period that is output as a result of transmission and reception of waves by a radio wave sensor mounted on a vehicle;
a signal extraction unit configured to extract specific-intensity signals in a predetermined reflection intensity range from the detection signal group, and
a determination unit configured to determine whether an occupant in the vehicle is in a first riding state in which the occupant is directly seated on a seat or in a second riding state in which the occupant is seated in an infant auxiliary device, based on a distribution mode of the specific-intensity signals,
wherein the determination unit determines whether the occupant is in the first riding state or the second riding state, based on a distribution position of a number of specific-intensity signals, and
wherein the distribution position of the number of specific-intensity signals indicates one of a first distribution region for the first riding state or a second distribution region for the second riding state.

2. The seating state detection device according to claim 1, wherein
the signal extraction unit extracts a number of first detection signals included in a first reflection intensity range of a predetermined first intensity or higher and a number of second detection signals included in a second reflection intensity range including a first intensity, first detection signals and second detection signals being included in the detection signal group, and the determination unit determines whether the occupant is in the first riding state or the second riding state, based on a magnitude of a difference between the number of first detection signals and the number of second detection signals.

3. The seating state detection device according to claim 1, wherein the signal extraction unit acquires the detection signal group when a detection wave of the radio wave sensor is transmitted to a position corresponding to a chest portion of the occupant being seated.

\* \* \* \* \*